(12) United States Patent
Bernard et al.

(10) Patent No.: US 9,221,712 B2
(45) Date of Patent: Dec. 29, 2015

(54) PROCESS FOR PRODUCING A CYLINDRICAL COMPONENT MADE OF GLASS BY ELONGATION

(71) Applicants: Thomas Bernard, Karlsruhe (DE); Harald Hain, Kahl (DE); Thomas Bogdahn, Karlstein (DE); Oliver Ganz, Bruchköbel (DE)

(72) Inventors: Thomas Bernard, Karlsruhe (DE); Harald Hain, Kahl (DE); Thomas Bogdahn, Karlstein (DE); Oliver Ganz, Bruchköbel (DE)

(73) Assignees: Heraeus Quarzglas GmbH & Co. KG, Hanau (DE); Fraunhofer Gesellschaft zur Förderung der angewandten Forschung e.V., Munich (DE)

( * ) Notice: Subject to any disclaimer, the term of this patent is extended or adjusted under 35 U.S.C. 154(b) by 62 days.

(21) Appl. No.: 14/354,130

(22) PCT Filed: Oct. 17, 2012

(86) PCT No.: PCT/EP2012/070538
§ 371 (c)(1),
(2) Date: Apr. 24, 2014

(87) PCT Pub. No.: WO2013/060606
PCT Pub. Date: May 2, 2013

(65) Prior Publication Data
US 2014/0245796 A1  Sep. 4, 2014

(30) Foreign Application Priority Data
Oct. 17, 2012 (DE) .................... 10 2011 116 806

(51) Int. Cl.
*C03B 23/047* (2006.01)
*C03B 37/025* (2006.01)
*C03B 37/012* (2006.01)

(52) U.S. Cl.
CPC ....... *C03B 37/0253* (2013.01); *C03B 37/01242* (2013.01); *C03B 2205/63* (2013.01); *C03B 2205/72* (2013.01)

(58) Field of Classification Search
CPC ...... C03B 23/04; C03B 23/047; C03B 37/02; C03B 37/025; C03B 37/0253
USPC ........................................... 65/29.19
See application file for complete search history.

(56) References Cited

U.S. PATENT DOCUMENTS 4,793,840 A * 12/1988 Harding ................... 65/381
5,079,433 A * 1/1992 Smith ................ 250/559.24
(Continued)

FOREIGN PATENT DOCUMENTS

DE 19536960 A1 3/1996
EP 1533283 B1 8/2011
(Continued)

OTHER PUBLICATIONS

Espacenet English language abstract of DE 19536960 A1, published Mar. 21, 1996.
(Continued)

*Primary Examiner* — Matthew Daniels
*Assistant Examiner* — Cynthia Szewczyk
(74) *Attorney, Agent, or Firm* — Tiajoloff & Kelly LLP

(57) ABSTRACT

A method for using a temperature control loop in order to further develop process control during elongation of a cylindrical preform such that a component strand with high dimensional accuracy can be drawn even in the presence of temperature-effective defects during the elongation process: (a) the continuous measurement of a first temperature value, $T_{top}$, at an upper measuring point on the surface of the cylindrical preform; (b) the continuous measurement of a second temperature value, $T_{bottom}$, at a lower measuring point; (c) calculation of a temperature distribution in the region between the measuring points $T_{top}$ and $T_{bottom}$, and determination of a modelled deformation temperature, $T_{model}$, using an algorithmic model taking with first and the second temperature values as model input parameters, and the modelled deformation temperature, $T_{model}$, as a regulating variable and the heating-zone temperature $T_{oven}$ as a manipulated variable for the temperature-control loop.

16 Claims, 2 Drawing Sheets

(56) References Cited

U.S. PATENT DOCUMENTS

Figure 1:
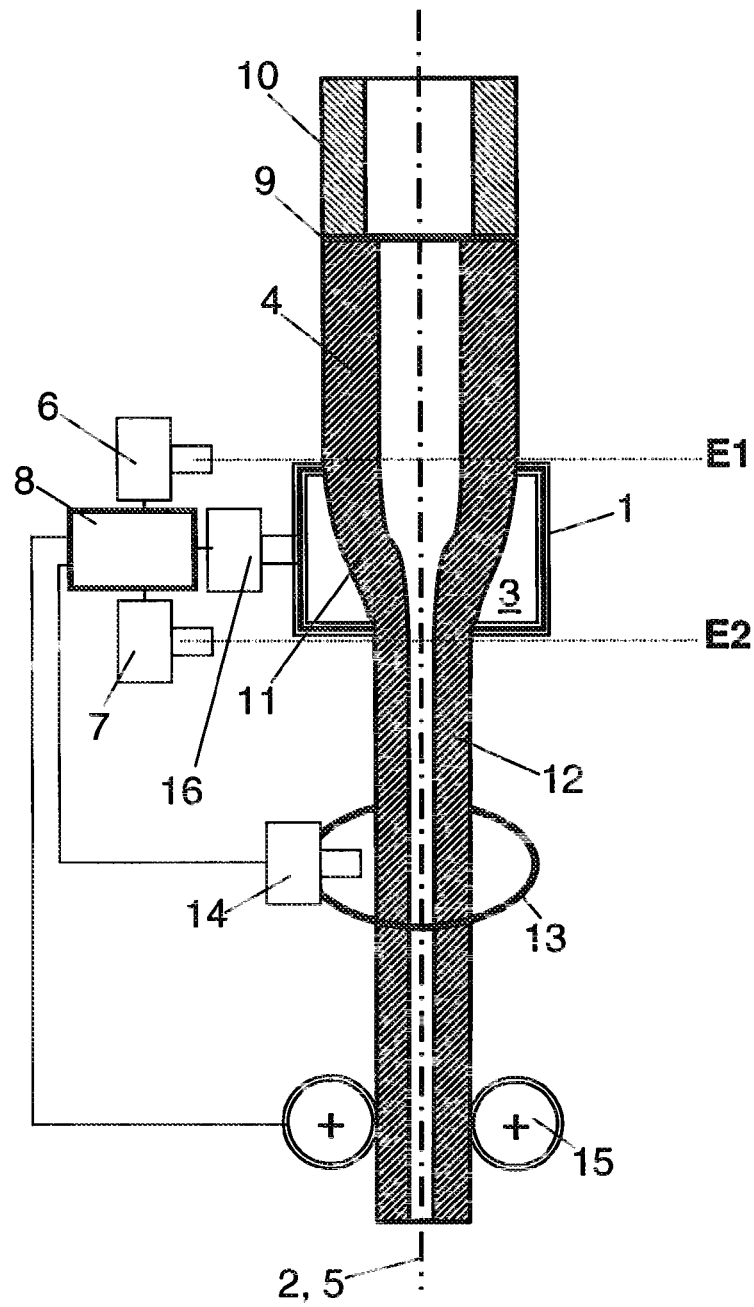

| | | |
|---|---|---|
| 5,314,517 A | 5/1994 | Koening et al. |
| 5,443,610 A | 8/1995 | Urruti |
| 5,551,967 A | 9/1996 | Urruti |
| 6,098,428 A | 8/2000 | Bogdahn et al. |
| 6,735,983 B1 * | 5/2004 | Taru et al. ............ 65/377 |
| 7,637,125 B2 | 12/2009 | Nakanishi et al. |
| 8,015,845 B2 | 9/2011 | Nakanishi et al. |
| 8,024,945 B2 | 9/2011 | Nakanishi et al. |
| 2005/0144983 A1 | 7/2005 | Nakanishi et al. |
| 2010/0064733 A1 | 3/2010 | Nakanishi et al. |
| 2010/0236289 A1 | 9/2010 | Nakanishi et al. |

FOREIGN PATENT DOCUMENTS

| | | |
|---|---|---|
| JP | 0337129 A | 2/1991 |
| JP | 03037129 A | 2/1997 |

OTHER PUBLICATIONS

English language abstract of JP 03037129 A, published Feb. 19, 1997.

English language abstract of JP 0337129 A, published Feb. 18, 1991.

* cited by examiner

PROCESS FOR PRODUCING A CYLINDRICAL COMPONENT MADE OF GLASS BY ELONGATION

The present invention refers to a method for producing a cylindrical component of glass by elongating a start cylinder using a process control comprising a plurality of control loops, inter alia a temperature control loop, where the start cylinder is fed beginning with one end and at a feed rate $v_f$ to a heating zone with a heating zone temperature $T_{furnace}$ and is softened region by region in the heating zone, and a component strand is drawn off in the direction of a drawing axis continuously and at a draw rate $v_s$ from the softened region so as to form a drawing bulb, and the component is cut to length therefrom.

In such drawing processes, which e.g. serve to produce tubes, rods, hollow fibers and solid fibers and are often accompanied by a high degree of deformation of the start cylinder, one fundamental task consists in producing a component of a dimensional accuracy that is as high as possible. In process controls with simple control loop the diameter of the component strand, for instance, serves as a controlled variable and the draw-off rate of the component as the manipulated variable. However, when high demands are made on the dimensional accuracy of the components, this requires more complicated control processes with a plurality of interleaved control loops.

Specifically, an approximately constant viscosity in the region of the so-called "drawing bulb" is imperative for a high accuracy of the diameter control.

PRIOR ART

To achieve this goal, it is suggested in a method for producing optical fibers according to JP 03-037129 that the temperature in the drawing bulb should be kept as constant as possible. A glass preform is supplied from above to an annular electric heating element, it is softened in said element and the optical fiber is drawn off from the softened region so as to form a drawing bulb. The fiber runs through a diameter measuring device by means of which the fiber diameter is continuously measured. The fiber draw-off device is equipped with a device for measuring the fiber tension. The measurement values for the fiber diameter and for the tension are supplied to a control unit. The tension serves as a measure of the temperature of the glass in the drawing bulb and is used for controlling the temperature of the heating element.

In general, the temperature of the heating device rapidly reacts to changes in the corresponding temperature controller. However, due to the low thermal conductivity of the glass and its thermal capacity, changes in the temperature of the heating element have an effect, also depending on the mass of the drawing bulb, on the viscosity of the glass only after a long delay. Due to the accompanying measurement dead time, the known control method is slow and tends to overshoot.

The drawback of the process-inherent measurement dead times is mitigated by the drawing method known from DE 195 369 60 A1. A prediction on the value of the final component diameter to be expected is simulated on the basis of a diameter detection in the region of the drawing bulb with the help of a realistic model, and said calculated value without any dead times is used as a control value for diameter control.

In addition, the temperature of the drawing bulb is measured by means of pyrometers and this temperature is used in a cascade control as a main controlled variable and the temperature of the heating device is used as an auxiliary controlled variable. On the one hand, this yields a control path of a short integration time for the highly constant control of the temperature of the heating device and, on the other hand, a control path with a long integration time that may serve to adjust the viscosity in the region of the drawing bulb.

The known control process, based on measurements of diameter and temperature in the region of the drawing bulb in combination with a model for the prediction of the final component diameter, leads in stationary phases of the elongation process to a dimensional accuracy of the drawn-off component that also satisfies high demands.

A considerable local dependence of the surface temperature manifests itself in the region of the drawing bulb. Moreover, the drawing bulb may move within the heating zone. The local measurement of the surface temperature in the region of the drawing bulb only yields one single temperature value that is of little significance with respect to the mean viscosity of the glass in the region of the drawing bulb.

Difficulties will therefore arise specifically upon changes in process parameters, which in the heating zone lead to strong temperature changes as may occur in practice e.g. in the case of irregularities in the start cylinder to be drawn off or towards the end of the process.

TECHNICAL OBJECTIVE

With the process model-based control concept of the known method, it is not possible to completely exclude diameter fluctuations in the component.

It is therefore the object of the present invention to develop the process control of the known method such that even in the event of temperature-effective defects during the elongation process it is possible to draw a component strand of high dimensional accuracy.

GENERAL REPRESENTATION OF THE INVENTION

Starting from the aforementioned situation, this object is achieved according to the invention in that in the temperature control loop the following measures are taken:

continuously measuring a first temperature value $T_{top}$ at an upper measurement point of the surface of the start cylinder;

continuously measuring a second temperature value $T_{bottom}$ at a lower measurement point, which is spaced apart from the upper measurement point in the direction of the drawing axis, with the drawing bulb or at least a part thereof extending between upper and lower measurement point;

calculating a temperature distribution of the start cylinder in the region between the measurement points of first temperature value $T_{top}$ and second temperature value $T_{bottom}$, and determining a modeled deformation temperature $T_{model}$ on the basis of an algorithmic model in consideration of the first and the second temperature value as model input parameters; and using the modeled deformation temperature $T_{model}$ as a controlled variable and using the heating zone temperature $T_{furnace}$ as a manipulated variable of the temperature control loop.

It is the aim in temperature control to keep the viscosity of the glass in the deformation zone, which is here designated as a "drawing bulb", as constant as possible during the elongation process. "Drawing bulb" or "deformation region" stands for the softened region in which the start cylinder is subjected to plastic deformation.

In contrast to the aforementioned prior art, the temperature control in the inventive method is however not based on a single local measurement of the surface temperature of the glass in the region of the drawing bulb, but on a measurement of two temperatures at measurement points that are spaced apart from each other in the direction of the drawing axis.

The upper measurement point—for the first temperature value is—located above or within the upper drawing-bulb region; in a vertical drawing method from the top to the bottom, for instance on the upper edge of a heating element. The lower measurement point—for the second temperature value—is located within the lower drawing bulb region or below the drawing bulb, for instance on the lower edge of the heating element. The temperatures are measured "successively", i.e. continuously or discontinuously; in the case of a discontinuous measurement the process control is the more accurate the shorter the time intervals between successive measurements have been chosen.

The measured temperature values are input values for an algorithmic model which simulates a one-, two- or three-dimensional realistic temperature distribution of the output cylinder, namely at least for the region that is currently positioned between the measurement points of first temperature value $T_{top}$ and second temperature value $T_{bottom}$. As an integral or mean value of the temperature distribution determined in this way, one obtains a modeled deformation temperature $T_{model}$ that represents a measure of a mean temperature or a mean viscosity, respectively, of the glass in the deformation region.

In this respect the modeled deformation temperature $T_{model}$ enjoys a significance that is similar to that of the draw-off tension for the purpose of determining a mean viscosity in the drawing bulb in the aforementioned technique. By contrast, the modeled deformation temperature $T_{model}$ is however based on real and current temperature measurement values that permit an early consideration of changes, namely as soon as these announce themselves as a temperature change of first or second temperature and at any rate clearly before they manifest themselves as a significant change in the mean viscosity of the drawing bulb.

The algorithmic model may here also be of help in that it contains realistic simulations and predictive control responses particularly for the parameter changes that often occur in practice during the elongation process.

When the modeled deformation temperature $T_{model}$ is used as a controlled variable of the temperature control loop, one will therefore obtain a predictive control with short integration duration. The heating zone temperature $T_{furnace}$ or a parameter that can be correlated therewith, e.g. the heat current for heating the heating zone, serves here as the manipulated variable.

Since the algorithmic model simulates a temperature distribution at least between the measurement points of first and second temperature; a permanent adjustment is possible in that the real temperature measurement values are compared with the modeled temperature values at the respective measurement point. In this respect the model is suited for adaption during the elongation process.

In this connection it has turned out to be advantageous when the algorithmic model can be calibrated during elongation in the sense that it continually detects deviations between the temperature values $T'_{top}$, $T'_{bottom}$, which are modeled at the measurement points of first temperature value and second temperature value, from the measured temperature values $T_{top}$ and $T_{bottom}$, and uses the measured temperature values as new calibration values for the determination of the deformation temperature $T_{model}$.

The algorithmic model is constantly recalibrated by reality in this respect.

As has already been mentioned above, the method according to the invention is designed for an early detection of disorders in the process sequence because of the temperature measurements at the upper and lower measurement point and permits a predictive control in this respect.

In view of this, a further improvement is achieved when the start cylinder is measured with respect to possible defects before or during elongation, and the axial position of each defect is communicated to the algorithmic model as an input parameter and when during elongation of the start cylinder the position of the defect relative to the heating zone and its position-dependent impact on the temperature in the heating zone are taken into account.

The defect manifests itself e.g. as a discontinuity in the geometry or in a change in the chemical composition of the start cylinder. The model is here qualitatively aware of the presumable impacts of the defect on the temperature in the heating zone and particularly in the drawing bulb. The exact impacts are determined online during the elongation process and a suitable control response is produced in combination with the temperature controller in response to these impacts and the current defect position so as to keep $T_{model}$ constant despite the defect.

In this connection it has also turned out to be advantageous when a start cylinder is used which on the face side is welded via a weld joint to an upper cylindrical glass component, with the axial position of the weld joint being communicated to the algorithmic model as an input parameter, and that during elongation of the start cylinder the position of the weld joint relative to the heating zone and the position-dependent impact thereof on the temperature in the heating zone are taken into account.

The upper glass component is fused with the start cylinder via a weld joint on the face side. The upper glass component is e.g. a further start cylinder to be elongated or a welded-on holder for the start cylinder. This is a disorder or discontinuity in the process sequence that is recurrent in each elongation process when said weld joint approaches the heating zone. The weld joint causes a heat build-up and has noticeable impacts on the temperature in the heading zone. In the model it is regarded as a heat source. It has been found that the temperature in the deformation region is rising and the viscosity decreasing in a corresponding manner. The glass thereby gets thinner, resulting in a higher mass throughput.

The algorithmic model recognizes the weld joint as a defect, on the one hand, due to a rise in temperature of the preceding temperature measurement at the upper measurement point, and in the preferred procedure moreover on the basis of input data on the axial position of the weld. When the start cylinder and the axial position of the weld joint are measured before the beginning of the elongation process, these input data can be entered in the model in advance. Alternatively, or in addition, the algorithmic model of these input data can be obtained "online" during the elongation process from a detection device for the weld joint that is arranged upstream of the upper temperature measurement point.

In this case, too, the model is qualitatively aware of the presumable impacts of the weld joint on the temperature in the heating zone and the theoretical impacts on the deformation region. To keep $T_{model}$ at the nominal value, the specific impacts are detected online during the elongation process and an appropriate control response is produced in combination with the temperature controller in reaction to said impacts and the current position of the weld joint.

Therefore, the algorithmic model turns out to be advantageous for coping with irregularities in the process sequence and particularly in the end phase of the elongation process. In the stationary phase of the elongation process in which no significant changes are to be expected, the temperature control on the basis of the algorithmic model can be disabled or reduced. In this respect a procedure is preferred in which the elongating process is a stationary phase, followed by an end phase, wherein the impact of the weld joint on the temperature in the heating zone in the stationary phase is neglected.

With respect to a fast algorithm it has turned out to be useful when the model is designed for calculating a one-dimensional temperature distribution of the start cylinder in the region between the measurement points of first temperature value $T_{top}$ and second temperature value $T_{bottom}$.

The duration for the calculation of the deformation temperature $T_{model}$ depends on the computing efforts for determining the modeled temperature distribution. The efforts are the smaller the smaller the volume of the data to be considered. In the case of cylindrical and particularly in the case of rotation-symmetrical start bodies, symmetry conditions permit the consideration of a one-dimensional temperature distribution along the drawing axis and thus a considerable reduction of data volume and computing time for modeling. Thus, the term "one-dimensional temperature distribution" only marks the temperature distribution depending on the height position.

Moreover, it has turned out to be advantageous when the draw rate $v_s$ and the feed rate $v_t$ serve as input parameters of the algorithmic model.

In the method according to the invention the lower measurement point is positioned in the lower portion of the drawing bulb or thereunder. At the same drawing bulb temperature the glass exhibits a higher temperature at this measurement point during fast withdrawal of the component strand than in the case of a slower withdrawal. This yields a pseudo effect which solely by raising the draw rate suggests a higher temperature in the region of the drawing bulb although this temperature is unchanged. To avoid unfavorable impacts of this pseudo effect, the model detects the drawing rate $v_s$ and the accompanying cooling of the drawn-off component strand up to the lower measurement point and also the feed rate $v_f$.

The calculation of the deformation temperature $T_{model}$ is preferably based on method solutions of differential equations according to the finite elements.

The drawing bulb is here subdivided into a number of finite small elements that can be described with a finite number of parameters.

EMBODIMENT

The invention shall now be explained in more detail with reference to embodiments and a drawing. In a schematic representation and in detail, FIG. 1 shows a drawing device for carrying out the method according to the invention in a side view, and FIG. 2 shows the structure of a temperature control without any dead times according to the invention.

Figure 2:
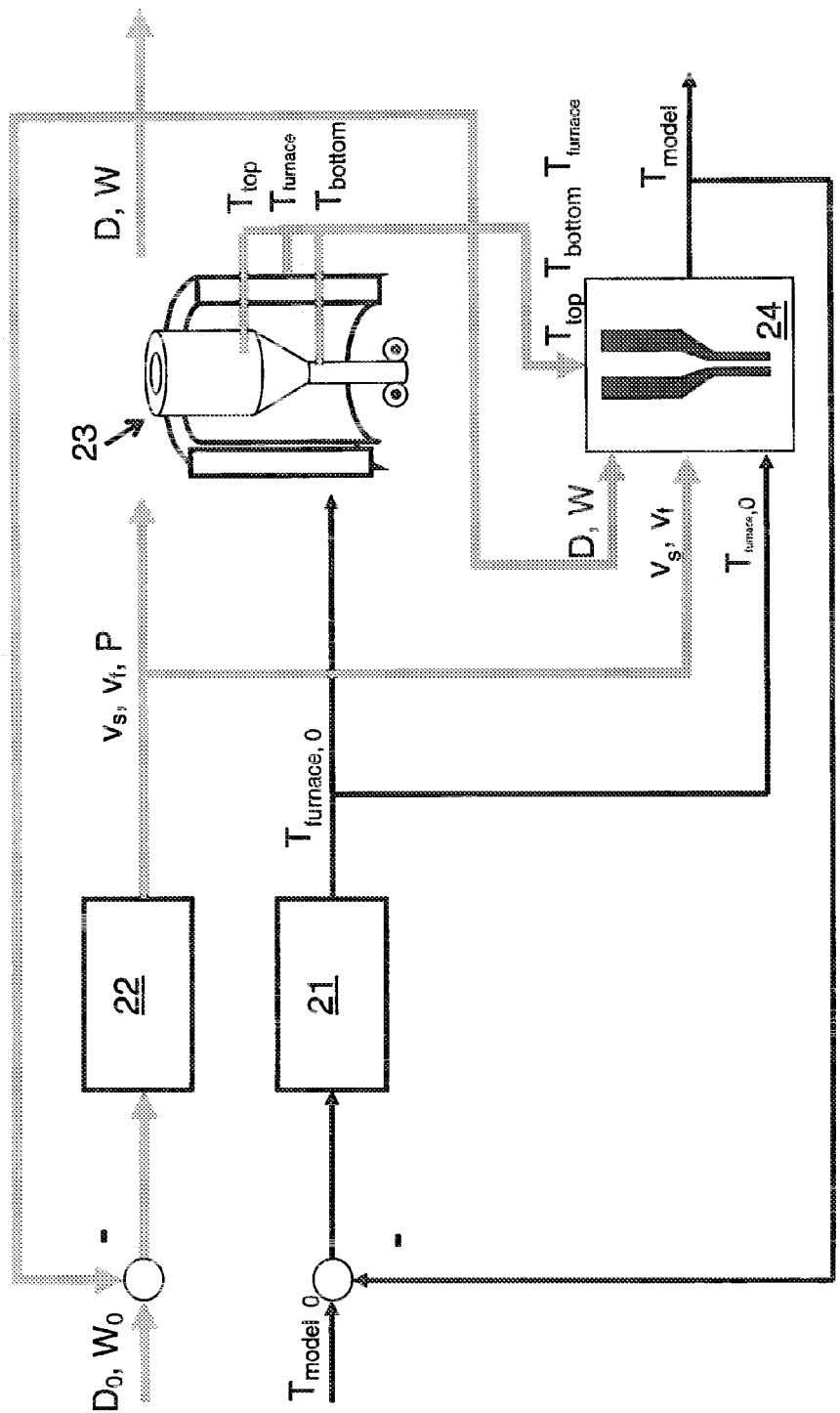

The drawing device of FIG. 1 comprises a resistance type heating furnace which consists substantially of a vertically oriented heating tube 1 of graphite that encloses a heating chamber 3 which is circular in horizontal cross-section. A hollow cylinder 4 of quartz glass having a longitudinal axis 5 oriented coaxial to the central axis 2 of the heating tube 1 projects into the upper open end of the heating tube 1.

A pyrometer 6 which detects the surface temperature $T_{top}$ of the hollow cylinder 1 is arranged at the level of an upper detection plane E1 (at the upper end of the heating tube 1). A further pyrometer 7 which detects the surface temperature $T_{bottom}$ of the elongated hollow cylinder 1 is arranged at the level of a lower detection plane E2 (at the lower end of the heating tube 1). The temperature measurement values of the pyrometers 6 and 7 and also the temperature of the heating tube 1 $T_{furnace}$ measured by the pyrometer 16 are each supplied to a computer 8.

The upper end of the hollow cylinder 4 is connected via a weld joint 9 to a holding tube 10 of quartz glass by means of which it is movable in horizontal and vertical direction. The hollow cylinder 4 is softened in the heating chamber 3 and a quartz glass tube 12 is drawn off vertically downwards from the softened region so as to form a drawing bulb 11. The quartz glass tube 12 is here passed through a sliding contact ring 13 which simultaneously serves as a guide rail for a wall-thickness measuring device 14 which is rotatable about the outer circumference of the quartz glass tube 12. With the help of the wall-thickness measuring device 14 which is also connected to the computer 8, a wall thickness profile of the drawn-off quartz glass tube 12 can be recorded during the drawing process and this profile can be evaluated with the help of the computer 8 with respect to diameter D and wall thickness W.

The tube draw-off rate $v_s$ is detected by means of a draw-off device 15 and adjusted via the computer 8

The problem to be solved by control engineering consists in estimating a reliable value of the deformation temperature $T_{model}$ with the help of a model that is as realistic as possible. The solution according to the invention consists in implementing a spatially distributed one-dimensional temperature model of the hollow cylinder from the level E1 of the upper temperature sensor to the level E2 of the lower temperature sensor and in letting it run along online during the elongation process. The temperature values of the hollow cylinder 4 measured in E1 and E2 and of the drawn-off tubular strand 12, respectively, are fed as input parameters into the model just like the standard model input parameters, such as furnace temperature, feed rate, draw-off rate, and wall thickness of hollow cylinder 4 and drawn-off tube 12.

The computer 8 is part of a central process control device with a plurality of interleaved control loops, among them a temperature control loop. Its structure and function shall be explained in detail hereinafter with reference to FIG. 2.

Essential components of the control loop are a PI controller 21 for the control of the furnace temperature $T_{furnace}$. A fuzzy PID controller 22 for the control of diameter D and wall thickness W of the drawn-off tube strand 12 and for the adjustment of the manipulated variables draw-off rate $v_s$, feed rate $v_t$ of the cylinder 4 into the furnace 3 and of the internal pressure P of the tube. And a finite element model 24 (hereinafter also called FEM model), for modeling a one-dimensional spatial temperature distribution in the deformation region between the planes E1 and E2, from which a radially integrated, mean modeled temperature $T_{model}$ of this temperature distribution is determined. The deformation region substantially corresponds to the region of the drawing bulb 11. The drawing device on the whole is symbolized in FIG. 2 by reference numeral 23.

Input parameters for the FEM model 24 are the temperature values $T_{top}$, $T_{bottom}$ and $T_{furnace}$ measured on the furnace 3 and on the quartz glass cylinder 4, the current measurement values for tube diameter D and tube wall thickness W, the current speeds of feed device $v_f$ and draw-off device $v_s$. Moreover, information about the original length of the hollow cylinder 4 is entered into the FEM model 24 in advance, so that the model 24 is always aware of the current position of the weld joint 9 relative to the heating tube 1 on the basis of the integrated feed rate data.

The FEM model 24 calculates the current actual value for the modeled temperature $T_{model}$ on the basis of the input data. This value serves as a controlled variable and is passed on to the PI controller 21 which on the basis of this and the current nominal value $T_{model,0}$ requires either an increase or reduction of the furnace temperature. The newly adjusted temperature value $T_{furnace, nominal}$ is also transmitted to the FEM model.

An embodiment for carrying out the vertical drawing method according to the invention for producing a quartz glass tube shall now be explained in more detail with reference to FIGS. 1 and 2.

The following parameters are fed into the central process control device (computer 8): The draw-off rate detected by the speed measuring device, the outer diameter D of the tube measured by the wall-thickness measuring device 14, and the wall thickness W of the tube, the temperature $T_{furnace}$ of the heating tube 1 measured by the pyrometer 16, and the internal pressure P of the tube determined by a pressure measuring device (which is also not shown). The process control device 8 controls the pressure gas valve, the temperature controller 21 of the furnace and the controller 22 for withdrawal and feed.

A nominal value calculated from the above-mentioned input data by the FEM model for the modeled temperature $T_{model}$ in the deformation region is preset for the furnace temperature controller 21 and said value is taken into account in the adjustment of the furnace temperature $T_{furnace}$.

The hollow cylinder 4 of quartz glass is supplied to the furnace 3 at a constant feed rate $v_z$, the temperature of the furnace 3 being first set to about 2200° C. The modeled $T_{model}$ determined by the FEM model 24, which is e.g. adjusted in advance and at a nominal value of about 1800° C., serves as a controlled variable for the temperature control of the furnace.

Hence, the outer diameter CI of the tubular strand 12 and the modeled temperature $T_{model}$ in the deformation region (11) are used as controlled variables of the process control. As manipulated variables, the blowing pressure is used for the outer diameter and the furnace temperature $T_{furnace}$ for the modeled temperature $T_{model}$ in the deformation region (11).

The control to the reference value of the modeled temperature $T_{model}$ in the deformation region (11) is explained hereinafter:

At the measurement points E1 and E2, the surface temperatures on the hollow cylinder 4 $T_{top}$ and on the drawn-off tubular strand 12 $T_{bottom}$ are measured. The data are transmitted to the FEM model 24 which first calibrates the model on the basis of the deviation of the measurement values ($T_{top}$, $T_{bottom}$) from the model values ($T'_{top}$, $T'_{bottom}$). Subsequently, the deformation temperature $T_{model}$ is odd calculated with the calibrated model and transmitted to the controller 21. Controller 21 adapts the nominal value $T_{furnace,0}$ for the furnace temperature in conformity with the deviation with respect to the nominal value $T_{model,0}$.

This control can be disabled during stationary operation, with the end of the stationary phase being e.g. characterized in that a minimum residual length of the hollow cylinder 4 is not reached. The invention turns out to be particularly useful in the directly succeeding non-stationary phase, which is due to the fact that the weld joint 9 which is approaching the furnace 3 from above acts as an additional radiation source which leads to a temperature increase with furnace chamber 3. Since the FEM model simulates a one-dimensional spatial temperature distribution, which is "simultaneously running" along with the advance movement of the hollow cylinder, over the current deformation region, the temperature change at the measurement point E1 is detected early and the increase in temperature is counteracted. This is supported by the measure that the FEM model also contains the position of the weld joint 9 as an input variable.

Hence, the end phase of the elongation process is detected through a temperature increase in the measurement plane E2 and through a previous entry of the geometrical data of the hollow cylinder 4 and can be compensated by reducing the furnace temperature. This yields a higher constancy of the temperature profile in the deformation region and thus a higher constancy of the dynamic deformation behavior. A reproducible stabilization of the dimensional accuracy of the tubular strand 12 is also accomplished in the non-stationary end phase of the elongation process, which has so far not been possible.

The invention claimed is:

1. A method for producing a cylindrical component of glass by elongating a start cylinder using a process control comprising a temperature control loop, said method comprising:
    feeding a start cylinder beginning with an end thereof and at a feed rate $v_f$ to a heating zone with a heating zone temperature $T_{furnace}$,
    softening the start cylinder in the heating zone so as to form a softened region,
    drawing off a component strand in the direction of a drawing axis from the softened region so as to form a drawing bulb, continuously and at a draw rate $v_s$, and
    cutting the component to length from the component strand,
    the temperature control loop being used in said drawing off, said control loop comprising:
    continuously measuring a first temperature value $T_{top}$ at an upper measurement point of the surface of the start cylinder;
    continuously measuring a second temperature value $T_{bottom}$ at a lower measurement point that is spaced apart from the upper measurement point in the direction of the drawing axis, with the drawing bulb or a part thereof extending between the upper and the lower measurement points;
    calculating a temperature distribution of the start cylinder in a region between the measurement points of said first temperature value $T_{top}$ and said second temperature value $T_{bottom}$, and determining a modeled deformation temperature $T_{model}$ on the basis of an algorithmic model using the first and the second temperature values as model input parameters, and
    using the modeled deformation temperature $T_{model}$ as a controlled variable and using the heating zone temperature $T_{furnace}$ as a manipulated variable of the temperature control loop.

2. The method according to claim 1, wherein the algorithmic model is calibrated during said drawing off by continuously detecting deviations between modeled temperature values $T'_{top}$ and $T'_{bottom}$, which are modeled at the measurement points from the measured temperature values $T_{top}$ and $T_{bottom}$, and then using the measured temperature values as new calibration values for determining the deformation temperature $T_{model}$.

3. The method according to claim 2, and further comprising measuring the start cylinder for possible defects prior to or during elongation in said drawing off,
    wherein the axial position of each defect is communicated to the algorithmic model as an input parameter, and during elongation of the start cylinder the algorithmic model takes into account the axial position of the defect relative to the heating zone and the effect thereof on the temperature in the heating zone.

4. The method according to claim 3,
wherein the start cylinder has a face side that is welded, via a weld joint, to an upper cylindrical glass component,
wherein the axial position of the weld joint is communicated to the algorithmic model as an input parameter, and during the elongation of the start cylinder, the algorithmic model takes into account the axial position of the weld joint relative to the heating zone and the effect thereof on the temperature in the heating zone.

5. The method according to claim 4,
wherein the elongation comprises a stationary phase, followed by an end phase, and wherein the algorithmic model disregards the effect of the weld joint on the temperature in the heating zone in the stationary phase.

6. The method according to claim 2,
wherein the start cylinder has a face side that is welded, via a weld joint, to an upper cylindrical glass component,
wherein the axial position of the weld joint is communicated to the algorithmic model an input parameter, and during the elongation of the start cylinder, the algorithmic model takes into account the axial position of the weld joint relative to the heating zone and the effect thereof on the temperature in the heating zone.

7. The method according to claim 6,
wherein the elongation comprises a stationary phase, followed by an end phase, and wherein the algorithmic model disregards the effect of the weld joint on the temperature in the heating zone in the stationary phase.

8. The method according to claim 2, wherein the draw rate $v_s$ and the feed rate $v_f$ are input parameters of the algorithmic model.

9. The method according to claim 2, wherein the calculation of the deformation temperature $T_{model}$ is based on solutions of differential equations according to a finite element method.

10. The method according to claim 1, and further comprising
measuring the start cylinder for possible defects prior to or during elongation in said drawing off,
wherein the axial position of each defect is communicated to the algorithmic model as an input parameter, and during elongation of the start cylinder the algorithmic model takes into account the axial position of the defect relative to the heating zone and the effect thereof on the temperature in the heating zone.

11. The method according to claim 1,
wherein the start cylinder has a face side that is welded, via a weld joint, to an upper cylindrical glass component,
wherein the axial position of the weld joint is communicated to the algorithmic model as an input parameter, and during the elongation of the start cylinder, the algorithmic model takes into account the axial position of the weld joint relative to the heating zone and the effect thereof on the temperature in the heating zone.

12. The method according to claim 11,
wherein the elongation comprises a stationary phase, followed by an end phase, and wherein the algorithmic model disregards the effect of the weld joint on the temperature in the heating zone in the stationary phase.

13. The method according to claim 1, wherein the model calculates a one-dimensional temperature distribution of the start cylinder in the region between the measurement points of first temperature value $T_{top}$ and second temperature value $T_{bottom}$.

14. The method according to claim 1, wherein the draw rate $v_s$ and the feed rate $v_f$ are input parameters of the algorithmic model.

15. The method according to claim 1, wherein the calculation of the deformation temperature $T_{model}$ is based on solutions of differential equations according to a finite element method.

16. The method according to claim 1, wherein the model calculates a one-dimensional temperature distribution of the start cylinder in the region between the measurement points of first temperature value $T_{top}$ and second temperature value $T_{bottom}$.

* * * * *

UNITED STATES PATENT AND TRADEMARK OFFICE
CERTIFICATE OF CORRECTION

| | |
|---|---|
| PATENT NO. | : 9,221,712 B2 |
| APPLICATION NO. | : 14/354130 |
| DATED | : December 29, 2015 |
| INVENTOR(S) | : Thomas Bernard et al. |

It is certified that error appears in the above-identified patent and that said Letters Patent is hereby corrected as shown below:

Title Page, item (30) "Foreign Application Priority Data":

Please change Oct. 17, 2012 to Oct. 25, 2011.

Signed and Sealed this
Twenty-second Day of March, 2016

Michelle K. Lee
*Director of the United States Patent and Trademark Office*